United States Patent

Lilleberg et al.

[11] Patent Number: 5,905,946
[45] Date of Patent: May 18, 1999

[54] METHOD FOR ESTIMATING A CHANNEL AND A RECEIVER

[75] Inventors: Jorma Lilleberg, Oulu; Timo Laakso, Helsinki, both of Finland

[73] Assignee: Nokia Mobile Phones Ltd., Salo, Finland

[21] Appl. No.: 08/912,418

[22] Filed: Aug. 18, 1997

Related U.S. Application Data

[63] Continuation of application No. 08/548,335, Nov. 1, 1995.

[30] Foreign Application Priority Data

Nov. 3, 1994 [FI] Finland ............................ 945190

[51] Int. Cl.[6] ........................................... H04B 1/10
[52] U.S. Cl. ..................... 455/63; 455/226.1; 370/441; 375/346
[58] Field of Search .................................. 455/422, 517, 455/63–67.1, 67.3, 226.1, 226.2, 226.3; 370/335, 441; 375/232–233, 346, 355

[56] References Cited

U.S. PATENT DOCUMENTS

| | | | |
|---|---|---|---|
| 5,329,547 | 7/1994 | Ling | 375/205 |
| 5,363,403 | 11/1994 | Schilling et al. | 370/441 |
| 5,553,062 | 9/1996 | Schilling et al. | 370/18 |

*Primary Examiner*—Reinhard J. Eisenzopf
*Assistant Examiner*—Sam Bhattacharya
*Attorney, Agent, or Firm*—Perman & Green, LLP

[57] ABSTRACT

A method for estimating a channel in a receiver of a cellular radio system, and a receiver in a cellular radio system, the receiver comprising means (22) for subjecting the received signal to elimination of multiple access interference. To obtain good channel estimates, the receiver of the invention comprises means (23) for computing channel estimates from a signal that has undergone elimination of multiple access interference. (FIG. 2)

2 Claims, 2 Drawing Sheets

METHOD FOR ESTIMATING A CHANNEL AND A RECEIVER

This application is a continuation of copending application Ser. No. 08/548,335, filed on Nov. 1, 1995.

FIELD OF THE INVENTION

The invention relates to a method for estimating a channel in a receiver of a cellular radio system in which the received signal is subjected to elimination of multiple access interference.

The method of the invention can be generally applied in any cellular radio system in which elimination of multiple access interference is applied, but it is particularly suited for use in a cellular radio system utilizing the CDMA multiple access method.

BACKGROUND OF THE INVENTION

CDMA is a multiple access method based on a spread spectrum technique, and it has been recently put into use in cellular radio systems in addition to previously used FDMA and TDMA. CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Band widths used in known test systems include e.g. 1.25 MHz, 10 MHz and 25 MHz. The multiplication spreads the data signal over the entire band to be used. All the users transmit simultaneously on the same frequency band. On each connection between a base station and a mobile station is used a different spreading code, and the signals of the users can be distinguished from one another in the receivers on the basis of the spreading code of the user. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals. In practice, the spreading codes correlate, and the signals of the other users make it more difficult to detect the desired signal by distorting the received signal. This interference caused by the users to one another is called multiple access interference.

The more simultaneous users there are in the system, the greater the multiple access interference. Thus the capacity of the CDMA cellular radio system is limited by the above-described interference that the users cause to one another. Interference can be reduced by maintaining, if possible, the power levels of the signals transmitted from the terminal equipments as equal as possible in the base station receiver by means of accurate power adjustment. The base station observes the power levels of the received signals and transmits power adjustment commands to terminal equipments. Another known way of reducing interference is to use different active methods of eliminating multiple access interference and methods based on simultaneous detection of a plural number of users.

The essential feature in a multipath channel is that the complex amplitude and the delay of each received signal component having a significant power level can be estimated so that the corresponding interference component can be eliminated from the desired signal. This determination of the amplitude and delay is called channel estimation.

In the prior art solutions of channel estimation, elimination of interference has not been taken into account but these two actions have been considered as mutually independent solutions. Due to this, the estimation results have been based on a signal that comprises interfering signals from a plural number of users, and so the estimation results are not ideal.

SUMMARY OF THE INVENTION

The object of the present invention is to provide a method of estimating a channel in which elimination of multiple access interference is taken into account.

This is achieved with a method of the type described in the introduction, which is characterized in that the channel estimation is based on a signal that has undergone elimination of multiple access interference.

The invention also relates to a receiver in a cellular radio system, the receiver comprising means for eliminating multiple access interference from the received signal. The receiver of the invention is characterized by comprising means for computing channel estimates from a signal that has undergone elimination of multiple access interference.

In the method of the invention, a channel estimator takes into account the elimination of the multiple access interference, and since the estimation is based on an interference-free signal, the channel estimates obtained are of much better quality than before.

The method of the invention is applicable for use with any channel estimation algorithm. Also, the solution described in the present invention does not define the method used for eliminating multiple access interference.

In one advantageous embodiment of the invention, channel parameters are estimated both before and after interference is eliminated. The channel estimates computed from the interference-free signal can be supplied as feedback to a first estimator, where they can be utilized.

BRIEF DESCRIPTION OF THE DRAWINGS

The invention can also be applied in multi-stage receivers: channel parameters can be estimated in the second and later stages after elimination of interference in the earlier stages.

In the following the invention will be described in greater detail with reference to the examples illustrated in the attached drawings, wherein.

DETAILED DESCRIPTION OF THE INVENTION

In the following the invention will be described using a CDMA cellular radio system as an example, but without limiting the invention thereto. It is not essential to the invention what multiple access system is used. The only condition is that some method of eliminating multiple access interference is employed. Multiple access interference elimination methods can be applied e.g. in TDMA systems, as well as in CDMA systems, for eliminating interference from a given channel.

Figure 1:
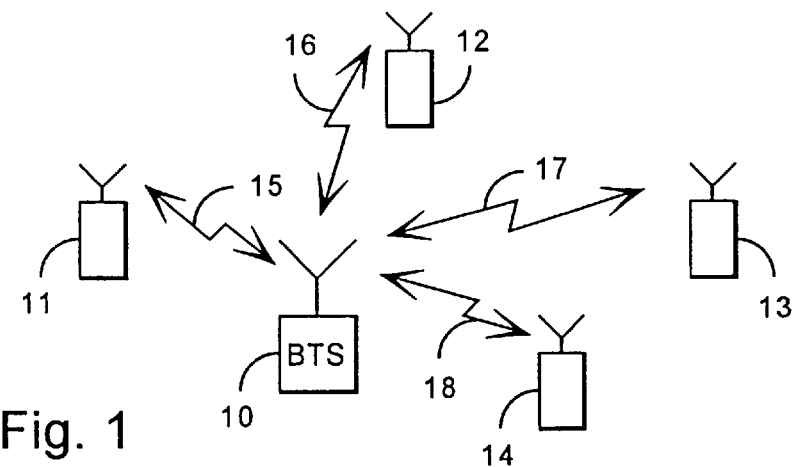
FIG. 1 shows part of a cellular radio system in which the method of the invention can be applied.

FIG. 1 shows part of a cellular radio system in which the method of the invention can be applied. The figure shows a base station 10 which communicates with subscriber equipments 11–14 located within its coverage area. In the CDMA system, each subscriber equipment transmits its own signal 15–18 to the base station on the same frequency band, and thereby interferes with the other subscriber equipments to some extent, depending on the cross-correlation characteristics of the spreading codes used. Likewise, the base station transmits a signal to all subscriber equipments on the same frequency band. The receivers may also receive signals from a neighbouring cell.

Figure 2:
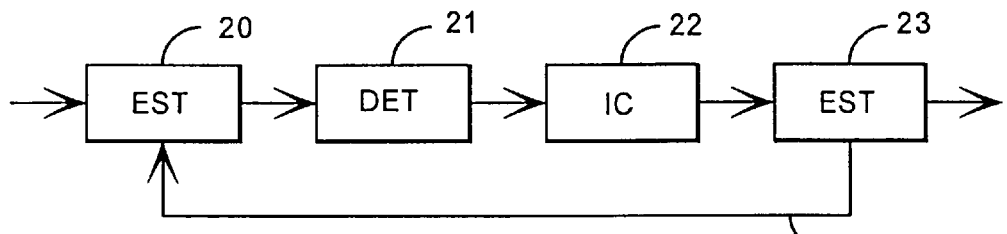
FIG. 2 is a block diagram illustrating the structure of a receiver according to the invention.

FIG. 2 is a block diagram illustrating the essential parts of the general structure of a receiver according to one advantageous embodiment of the method of the invention. The receiver comprises first estimation means 20 whose transmission is a received and digitalized signal and where preliminary channel estimation is conducted by a known estimation method. The features of the channel that are estimated are usually the complex amplitude and the delay. The receiver further comprises detection means 21, in which preliminary symbol estimates are computed for the received transmission. The receiver of the invention also comprises means 22 for eliminating interference from the received signal by a known interference elimination method. The receiver of the invention further comprises second estimation means 23, in which channel parameters of the interference-free signal are estimated, whereby more accurate estimates are obtained than in the first estimation means, which conduct the preliminary estimation. Also in the second estimation means the estimation can be conducted by a known estimation method.

In the receiver, it is also possible to utilize feedback 24 from the second estimation means 23 to the first estimation means 20. Estimation results obtained from the second estimation means can thus be utilized when preliminary estimates are computed, e.g. by supplying the channel parameters obtained from the second estimation means concerning sample $b_n$ to the first estimation means as default values for computing preliminary channel parameters for the next sample $b_{n+1}$.

Figure 3:
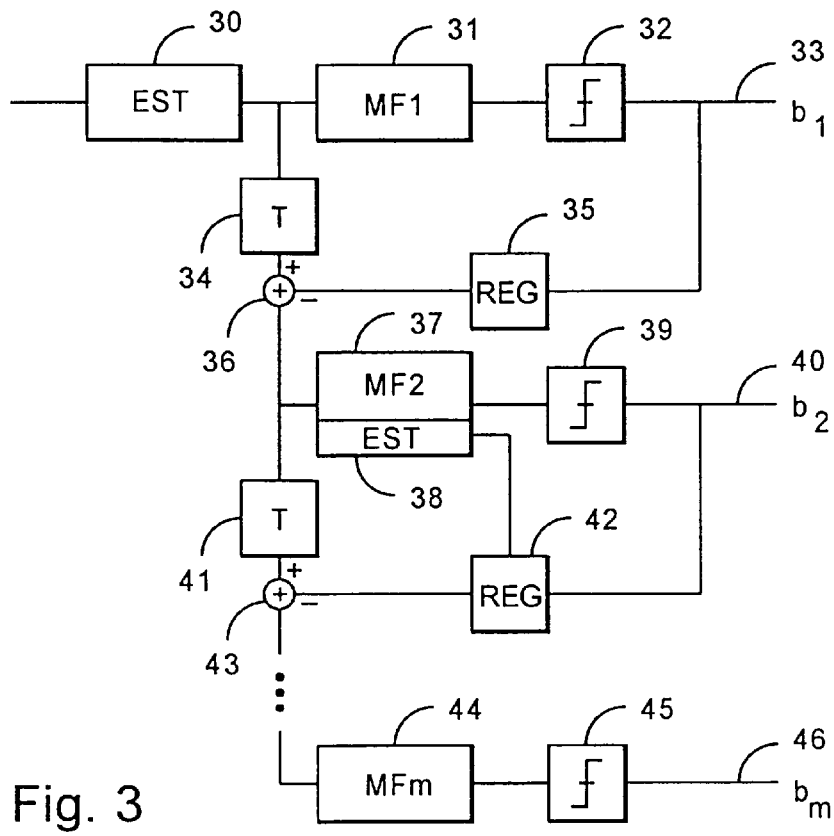
FIG. 3 is a block diagram illustrating an alternative structure of a receiver according to the invention.

FIG. 3 is a block diagram illustrating the essential parts of the general structure of a receiver according to another embodiment of the method of the invention. The receiver comprises a number of matched filters or RAKE receivers 31, 37, 44, each being arranged to receive and demodulate the signal of one user, and the signals being distinguishable by their spreading codes. The received transmission is supplied to a first estimation means 30, where preliminary channel parameters are estimated. From the estimation means the signal is supplied to a first matched filter 31, where the desired signal is demodulated, and further to a first detector 32, where a bit decision is made. A signal 33 obtained from the detector 32 and comprising an estimate of the transmission of the first user is supplied further to the other parts of the receiver and to a first regeneration means 35, where the detected signal is regenerated, i.e. multiplied by the spreading code. The regenerated signal obtained is supplied further to a first adder means 36, where it is extracted from the received transmission supplied to the adder means 36 via a first delay means 34.

The signal obtained from the first adder 36 thus comprises the received transmission from which the effect of the signal demodulated by the first matched filter 31, i.e. typically the strongest signal, has been extracted. The signal is supplied to a second estimation means 38 and a second matched filter 37. In the second estimation means 38, the channel parameters are re-estimated from the signal which has undergone interference elimination, i.e. from which the effect of the strongest signal has been extracted. The so obtained estimates are naturally of better quality than the estimates obtained from a signal that includes interference. The re-estimated signal is demodulated in the second matched filter 37, which is typically matched with the second strongest signal. As above, the signal obtained is detected in a second detector 39, and a detected signal 40 is supplied further to the other stages of the receiver. The signal 40 is also supplied to a second regeneration means 42, in which the detected signal is again regenerated, i.e. multiplied by the spreading code. In the regeneration, estimation results obtained in the second estimation means 38 are utilized. The regenerated signal is supplied further to a second adder means 43, where it is extracted from the received transmission, which is supplied to the adder 43 via a second delay means 41.

All the signals are estimated, demodulated, detected and regenerated in a similar manner in the receiver, until all the signals have been processed. Typically the signals are processed in the order of intensity so that the weakest signal is processed in a last matched filter 44 and detector 45, but the processing order may also be different. The essential feature of the receiver according to the invention is, however, that the channel parameters of the signals are estimated on the basis of a signal which has undergone interference elimination, i.e. from which the effect of the signals that are stronger than those of the user concerned has been extracted.

Figure 4:
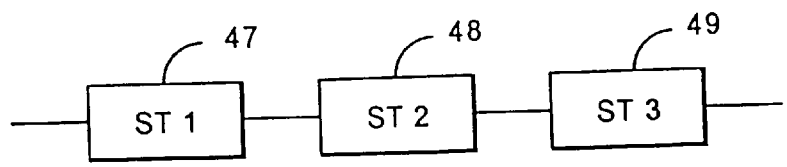
FIG. 4 is a block diagram illustrating the structure of a multistage receiver according to the invention.

The method of the invention can also be applied in a multistage receiver in which all the users received are processed in parallel, and in which symbol estimates are specified in successive receiver stages by repeating the receive procedure after the interference elimination a desired number of times. Likewise, channel estimates can be specified iteratively in each stage. FIG. 4 illustrates the general structure of a multistage receiver. In the figure, the receiver comprises three successive receiver stages 47–49, and in each stage are estimated the symbol estimates of the incoming signal. The later stages always produce a more accurate result than the earlier stages. In the receiver of the invention, multiple access interference can be eliminated and channel parameters of the ingoing signal can be estimated in each stage. In the later stages, the parameters are thus estimated from a signal of better quality than in the earlier stages, and the estimates obtained are more accurate.

Figure 5:
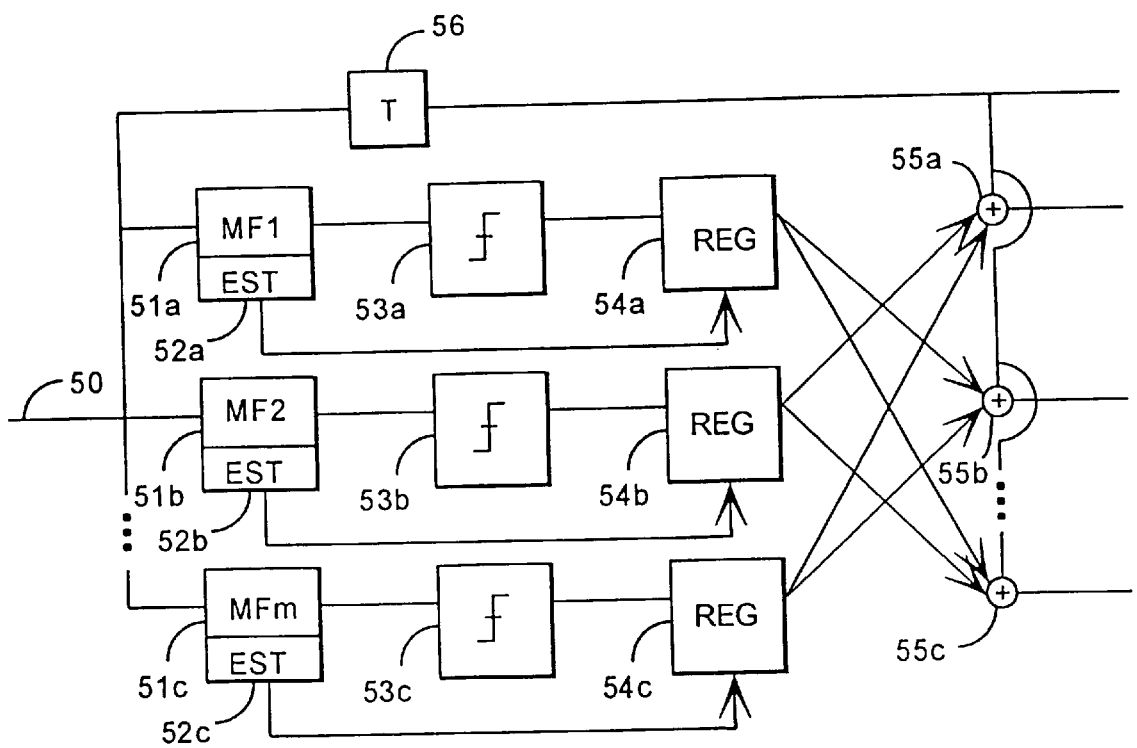
FIG. 5 illustrates the structure of one receiver stage.

FIG. 5 is a block diagram illustrating one possible structure of one receiver stage in greater detail. Each stage can in principle be identical in structure. A receiver stage comprises a number of matched filters 51a–51c and estimation means 52a–a–52c, their input 50 being either a received signal or a signal obtained from the preceding stage. In each estimation means and matched filter, a signal of one received user is processed. If the stage is a second or a later stage, channel estimation is thus conducted after interference has been eliminated in an earlier stage. From each matched filter 51a–51c, the signal is supplied to a corresponding detector 53a–53c, in which a symbol estimate is computed for the received signal. The detected signal is supplied further to regeneration means 54a–54c, in which the detected signal is regenerated, and in which data obtained from the estimation means on the complex amplitudes and phases of the signals are utilized. The regenerated signals are supplied further to interference elimination means 55a–55c, which can be implemented e.g. by means of adders to which a transmission received via a delay means 56 is supplied and in which interference caused by signals from the other users is extracted, if desired, from the transmission concerned. The signal obtained is supplied further to the other stages of the receiver.

The solution of the invention is applicable for use in connection with any known channel estimation algorithm. Channel estimation can be implemented e.g. by a correlator tracking the peaks of the impulse response of a simple channel or by a decision-feedback estimator utilizing the received bit estimates.

The channel estimator may also involve filtering, whereby successive channel estimates are e.g. averaged to level the stochastic variation of the channel estimates. The filtering may comprise processing of the signal e.g. by linear, non-linear, adaptive or time-variant processing methods.

It is also possible to utilize a prediction procedure in the channel estimator, whereby the estimator tracks and predicts, if possible, changes concerning the channel. The prediction procedure can be implemented e.g. by a signal processor which computes default values for parameters on the basis of the estimates obtained.

Figure 6:
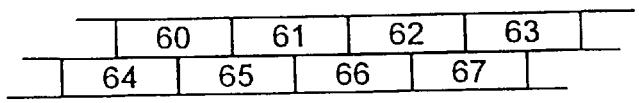
FIG. 6 illustrates shifting of frame structures in asynchronic traffic.

For the sake of simplicity, the method and receiver of the invention are described above by an example concerning primarily synchronic traffic. The solution of the invention, however, can also be used in a similar manner in asynchronic traffic. The requirements set by asynchrony must naturally be taken into account. Asynchronic traffic is illustrated in FIG. 6, which shows parts of two simultaneously received signals that comprise time slots 60–63 and 64–67 respectively. Since different transmissions are not synchronized with one another, the time slots are not in sync; this is different from synchronic transmission, in which the time slots are in sync. For example, when interference in time slot 61 is determined and eliminated, those parts of time slots 65 and 66 which coincide with time slot 61 must be taken into account.

Although the invention is described above with reference to an example illustrated in the attached drawings, it is to be understood that the invention is not limited thereto but can be varied in many ways within the inventive idea disclosed in the attached claims.

We claim:

1. A method for estimating a channel in a receiver of a cellular radio system that operates in accordance with a code division multiple access technique, comprising steps of:

receiving a code division multiple access signal that is subject to multiple access interference;

operating a first channel estimator to compute a first channel estimation on samples of the received signal to provide preliminary channel estimation results;

substantially eliminating multiple access interference from the samples of the received signal;

operating a second channel estimator to compute a second channel estimation on the samples of the received signal from which multiple access interference has been substantially eliminated, the second channel estimator providing improved channel estimation results; and feeding back the improved channel estimation results from the second channel estimator to the first channel estimator such that an improved channel estimation result for a sample $b_n$ is used by the first channel estimator when computing a preliminary channel estimate for a sample $b_{n+1}$.

2. A subscriber equipment for use in a cellular radio system that operates in accordance with a code division multiple access technique, said subscriber equipment comprising:

a receiver for receiving and sampling a code division multiple access signal that is subject to multiple access interference;

a first channel estimator for determining a first channel estimation on samples of the received signal to provide preliminary channel estimation results;

a multiple access interference eliminator for substantially eliminating multiple access interference from the samples of the received signal;

a second channel estimator, coupled to an output of said multiple access interference eliminator, for determining a second channel estimation on the samples of the received signal from which multiple access interference has been substantially eliminated, the second channel estimator outputting improved channel estimation results; and a feedback path for feeding back the improved channel estimation results from the second channel estimator to the first channel estimator such that an improved channel estimation result for a sample $b_n$ is used by the first channel estimator when determining a preliminary channel estimate for a sample $b_{n+1}$.

* * * * *